(12) United States Patent
Kim

(10) Patent No.: US 12,506,900 B2
(45) Date of Patent: Dec. 23, 2025

(54) ELECTRONIC APPARATUS FOR PLAYING A PLURALITY OF VIDEOS AT THE SAME TIME AND CONTROL METHOD THEREOF

(71) Applicant: SAMSUNG ELECTRONICS CO., LTD., Suwon-si (KR)

(72) Inventor: Namhyun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 39 days.

(21) Appl. No.: 18/376,673

(22) Filed: Oct. 4, 2023

(65) Prior Publication Data
US 2024/0146958 A1    May 2, 2024

Related U.S. Application Data

(63) Continuation of application No. PCT/KR2023/011371, filed on Aug. 2, 2023.

(30) Foreign Application Priority Data

Oct. 26, 2022 (KR) .................. 10-2022-0139308

(51) Int. Cl.
   *H04N 19/59* (2014.01)
(52) U.S. Cl.
   CPC .................. *H04N 19/59* (2014.11)
(58) Field of Classification Search
   CPC .................................................. H04N 19/59
   See application file for complete search history.

(56) References Cited

U.S. PATENT DOCUMENTS 6,339,434 B1 * 1/2002 West .................. G09G 5/391
                                                   348/581
8,391,370 B1 * 3/2013 Mukherjee .......... H04N 19/895
                                                   375/240.26
(Continued)

FOREIGN PATENT DOCUMENTS

CA      2 648 597 A1    10/2007
CN      109587546 A      4/2019
(Continued)

OTHER PUBLICATIONS

Yen Jonathan translation of JP 2009207145 A Feb. 25, 2009 (Year: 2009).*

(Continued)

*Primary Examiner* — Zaihan Jiang
(74) *Attorney, Agent, or Firm* — Sughrue Mion, PLLC

(57) ABSTRACT

The present disclosure provides methods, apparatuses, and computer-readable mediums for playing a plurality of streams. In some embodiments, an electronic apparatus includes a decoder configured to decode the plurality of streams, a plurality of buffers divided into a plurality of buffer groups corresponding to the plurality of streams, a first processor configured to acquire one frame, and at least one second processor. The at least one second processor is configured to identify an additional use rate of the first processor sufficient for playing an additional stream, and control the first processor to downscale at least one of the additional stream and each of the plurality of streams, based on a second determination that the additional use rate of the first processor exceeds the available use rate of the first processor.

18 Claims, 10 Drawing Sheets

(56) References Cited

U.S. PATENT DOCUMENTS

| | | | |
|---|---|---|---|
| 8,428,048 B2 | 4/2013 | Walker et al. | |
| 8,482,673 B2 | 7/2013 | Oh et al. | |
| 8,738,088 B2 | 5/2014 | Aaltone et al. | |
| 9,756,398 B2 | 9/2017 | Lee | |
| 9,787,862 B1* | 10/2017 | Newman | G11B 27/031 |
| 9,871,994 B1* | 1/2018 | Vaden | G11B 27/34 |
| 11,457,272 B2 | 9/2022 | Yang | |
| 12,262,037 B2* | 3/2025 | Choi | H04N 19/172 |
| 2006/0242669 A1 | 10/2006 | Wogsberg | |
| 2008/0186392 A1* | 8/2008 | Matsuyama | H04N 5/783 |
| | | | 348/E3.016 |
| 2009/0207187 A1 | 8/2009 | Lee | |
| 2011/0181781 A1 | 7/2011 | Oh et al. | |
| 2013/0246576 A1 | 9/2013 | Wogsberg et al. | |
| 2020/0014953 A1* | 1/2020 | Mammou | H04N 19/17 |
| 2020/0404269 A1* | 12/2020 | Choi | H04N 19/80 |
| 2021/0168432 A1 | 6/2021 | Levy et al. | |
| 2021/0203968 A1* | 7/2021 | Choi | H04N 19/188 |
| 2021/0289259 A1 | 9/2021 | Yang | |
| 2021/0306667 A1* | 9/2021 | Choi | H04N 19/61 |
| 2021/0368196 A1* | 11/2021 | Choi | H04N 19/188 |
| 2022/0295125 A1 | 9/2022 | Herrick et al. | |
| 2023/0179815 A1 | 6/2023 | Choi et al. | |

FOREIGN PATENT DOCUMENTS

| | | | | |
|---|---|---|---|---|
| JP | 2009207145 A | * | 9/2009 | G06V 10/28 |
| KR | 10-0560099 B1 | | 3/2006 | |
| KR | 10-2007-0100118 A | | 10/2007 | |
| KR | 10-0891111 B1 | | 3/2009 | |
| KR | 10-2011-0032993 A | | 3/2011 | |
| KR | 10-2013-0076674 A | | 7/2013 | |
| KR | 10-2099594 B1 | | 4/2020 | |
| KR | 10-2020-0130969 A | | 11/2020 | |
| KR | 10-2022-0014005 A | | 2/2022 | |
| KR | 10-2023-0103789 A | | 7/2023 | |
| TW | 201404173 A | * | 1/2014 | H04N 19/33 |
| WO | WO-2009061814 | * | 11/2008 | |

OTHER PUBLICATIONS

Zhang, Lei translation of TW 201404173 A Jun. 26, 2013 (Year: 2013).*

Communication dated Nov. 23, 2023, issued by the International Searching Authority in counterpart International Application No. PCT/KR2023/011371 (PCT/ISA/210).

Communication dated Nov. 23, 2023, issued by the International Searching Authority in counterpart International Application No. PCT/KR2023/011371 (PCT/ISA/237).

Communication issued on Oct. 7, 2025 by the European Patent Office in European Patent Application No. 23882850.3.

* cited by examiner

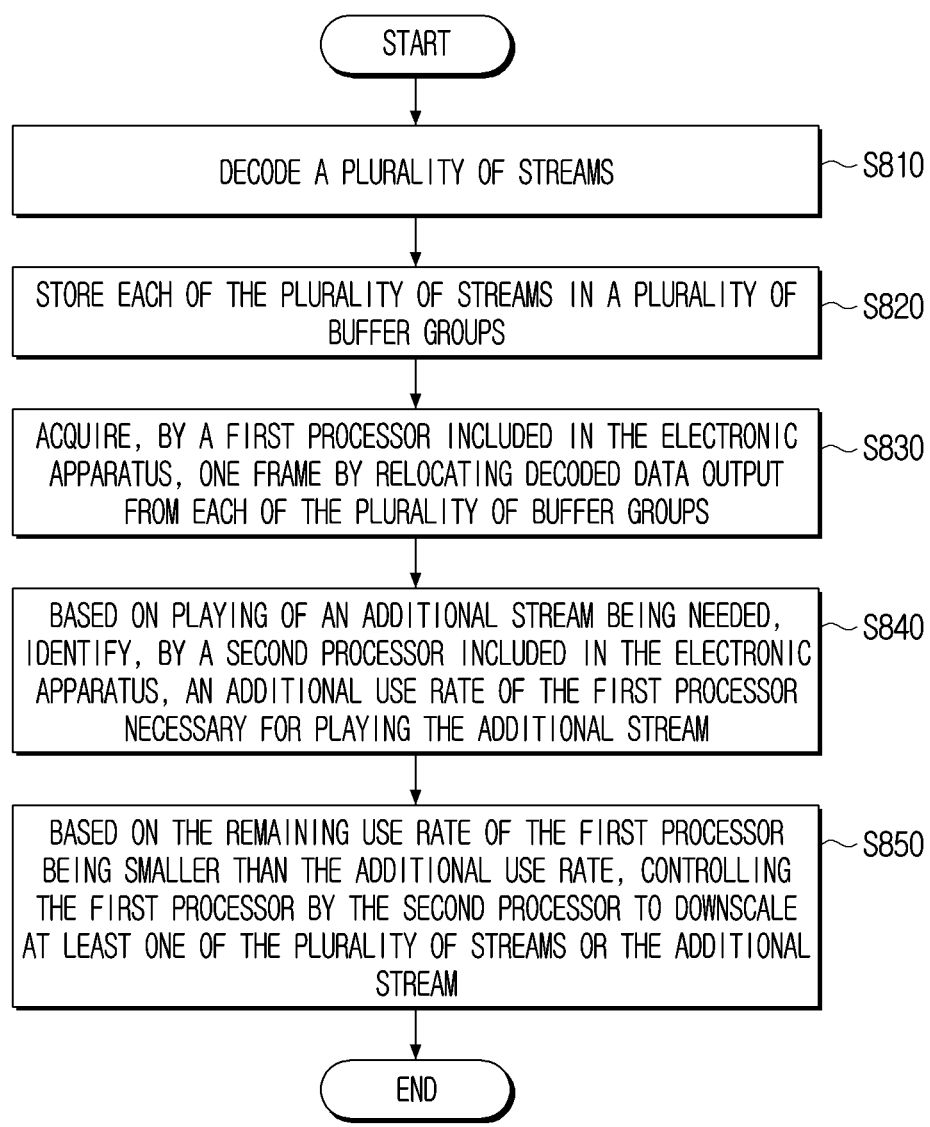

ELECTRONIC APPARATUS FOR PLAYING A PLURALITY OF VIDEOS AT THE SAME TIME AND CONTROL METHOD THEREOF

CROSS-REFERENCE TO RELATED APPLICATIONS

This application is a continuation application of International Application No. PCT/KR2023/011371, filed on Aug. 2, 2023, at the Korean Intellectual Property Office, which claims priority to Korean Patent Application No. 10-2022-0139308, filed on Oct. 26, 2022, at the Korean Intellectual Property Office, the disclosures of which are incorporated by reference herein in their entireties.

BACKGROUND

1. Field

The present disclosure relates generally to an electronic apparatus and a control method thereof, and more particularly, to electronic apparatus for playing a plurality of videos at the same time, and a control method thereof.

2. Description of the Related Art

With the development of electronic technologies, various types of electronic apparatuses are being developed. For example, recent advances in the performance of hardware and/or software of display apparatuses may allow for a plurality of videos to be played at the same time and/or substantially the same time.

However, resource management of a processor for image processing (e.g., a digital signal processor (DSP)) may be an important factor for playing a plurality of videos at the same and/or substantially the same time.

SUMMARY

According to an aspect of the present disclosure, an electronic apparatus for playing a plurality of streams is provided. The electronic apparatus includes a decoder, a plurality of buffers, a first processor, and at least one second processor. The decoder is configured to decode the plurality of streams. The plurality of buffers is divided into a plurality of buffer groups corresponding to the plurality of streams. The first processor is configured to acquire one frame by relocating decoded data output from each of the plurality of buffer groups. The at least one second processor is communicatively coupled with the decoder, the plurality of buffers, and the first processor, and is configured to control the electronic apparatus. The at least one second processor is further configured to identify an additional use rate of the first processor sufficient for playing an additional stream, based on a first determination that the additional stream is to be played. The at least one second processor is further configured to determine whether the additional use rate of the first processor exceeds an available use rate of the first processor. The at least one second processor is further configured to control the first processor to downscale at least one of the additional stream and each of the plurality of streams, based on a second determination that the additional use rate of the first processor exceeds the available use rate of the first processor.

In some embodiments, the at least one second processor may be further configured to identify a number of streams to be downscaled, based on the available use rate of the first processor and the additional use rate of the first processor.

In some embodiments, the at least one second processor may be further configured to identify a downscaling rate of streams to be downscaled, based on the available use rate of the first processor and the additional use rate of the first processor.

In some embodiments, the at least one second processor may be further configured to, based on determining that a resolution of at least one of the streams to be downscaled that has been downscaled by the downscaling rate is smaller than a predetermined lowest resolution threshold, downscale the at least one of the streams to be downscaled to the predetermined lowest resolution threshold, and increase a number of the streams to be downscaled.

In some embodiments, the at least one second processor may be further configured to control the first processor to downscale the at least one of the additional stream and each of the plurality of streams, based on the second determination that the additional use rate of the first processor exceeds the available use rate of the first processor, and according to respective resolutions of each stream of the at least one of the additional stream and each of the plurality of streams.

In some embodiments, the at least one second processor may be further configured to control the first processor to downscale at least one of the plurality of streams, based on the second determination that the additional use rate of the first processor exceeds the available use rate of the first processor.

In some embodiments, the at least one second processor may include a resource manager configured to identify the available use rate and the additional use rate, and a sampling operation part configured to identify a downscaling rate based on the available use rate and the additional use rate.

In some embodiments, the electronic apparatus may further include at least one scaler. In such embodiments, the at least one second processor may be further configured to control the at least one scaler to upscale the at least one downscaled stream of the additional stream and each of the plurality of streams.

In some embodiments, the at least one scaler may be configured to use a neural network model.

In some embodiments, the decoder may include a multi-format decoder.

In some embodiments, each buffer of the plurality of buffers may include four buffers.

According to an aspect of the present disclosure, a control method of an electronic apparatus for playing a plurality of streams is provided. The control method includes decoding the plurality of streams. The control method further includes storing the plurality of streams in a corresponding plurality of buffer groups. The control method further includes acquiring, by a first processor of the electronic apparatus, one frame by relocating decoded data output from each of the plurality of buffer groups. The control method further includes identifying, by a second processor of the electronic apparatus, an additional use rate of the first processor sufficient for playing an additional stream, based on determining that the additional stream is to be played. The control method further includes determining whether the additional use rate of the first processor exceeds an available use rate of the first processor. The control method further includes controlling the first processor, by the second processor, to downscale at least one of the additional stream and each of the plurality of streams, based on determining that the additional use rate of the first processor exceeds the available use rate of the first processor.

In some embodiments, the control method may further include identifying a number of streams to be downscaled, based on the available use rate of the first processor and the additional use rate of the first processor.

In some embodiments, the control method may further include identifying a downscaling rate of streams to be downscaled, based on the available use rate of the first processor and the additional use rate of the first processor.

In some embodiments, the control method may further include, based on determining that a resolution of at least one of the streams to be downscaled that has been downscaled by the downscaling rate is smaller than a predetermined lowest resolution threshold, downscaling the at least one of the streams to be downscaled to the predetermined lowest resolution threshold, and increasing a number of the streams to be downscaled.

In some embodiments, the control method may further include controlling the first processor, by the second processor, to downscale the at least one of the additional stream and each of the plurality of streams, based on the determining that the additional use rate of the first processor exceeds the available use rate of the first processor, and according to respective resolutions of each stream of the at least one of the additional stream and each of the plurality of streams.

In some embodiments, the control method may further include controlling the first processor, by the second processor, to downscale at least one of the plurality of streams, based on the determining that the additional use rate of the first processor exceeds the available use rate of the first processor.

In some embodiments, the control method may further include upscaling the at least one downscaled stream of the additional stream and each of the plurality of streams.

According to an aspect of the present disclosure, a non-transitory computer-readable storage medium, storing computer-executable instructions for playing a plurality of streams, is provided. The computer-executable instructions, when executed by at least one processor of an electronic apparatus, cause the electronic apparatus to decode the plurality of streams. The computer-executable instructions further cause the electronic apparatus to store the plurality of streams in a corresponding plurality of buffer groups. The computer-executable instructions further cause the electronic apparatus to acquire, by a first processor of the electronic apparatus, one frame by relocating decoded data output from each of the plurality of buffer groups. The computer-executable instructions further cause the electronic apparatus to identify, by a second processor of the electronic apparatus, an additional use rate of the first processor sufficient for playing an additional stream, based on a first determination that the additional stream is to be played. The computer-executable instructions further cause the electronic apparatus to determine whether the additional use rate of the first processor exceeds an available use rate of the first processor. The computer-executable instructions further cause the electronic apparatus to control the first processor, by the second processor, to downscale at least one of the additional stream and each of the plurality of streams, based on a second determination that the additional use rate of the first processor exceeds the available use rate of the first processor.

In some embodiments, the computer-executable instructions may further cause the electronic apparatus to identify at least one of a number of streams to be downscaled and a downscaling rate of the streams to be downscaled, based on the available use rate of the first processor and the additional use rate of the first processor.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 8 is a flow chart for illustrating a control method of an electronic apparatus, according to one or more embodiments of the present disclosure.

DETAILED DESCRIPTION

Figure 1A:
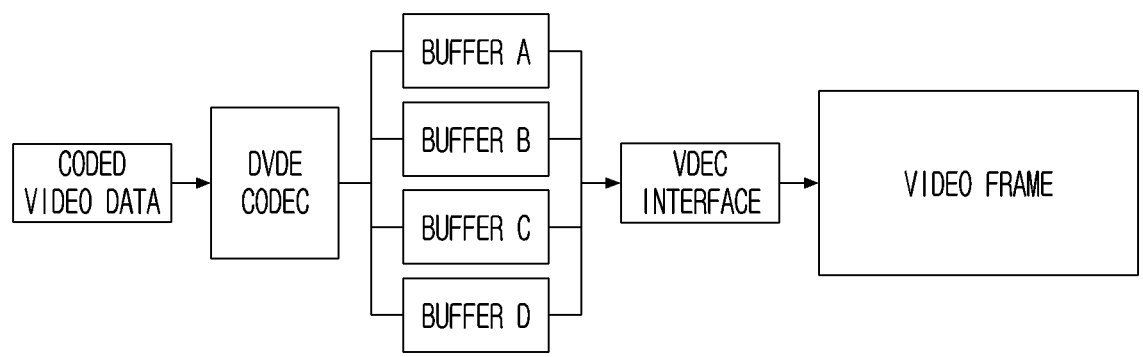
FIGS. 1A to 1C are diagrams for illustrating a method of processing a plurality of streams, according to one or more embodiments of the present disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but may include all modifications, equivalents, and substitutions without departing from the scope and spirit of the present disclosure. Alternatively or additionally, well-known functions and/or constructions may not be described in detail if the descriptions would obscure the present disclosure with unnecessary detail.

The present disclosure provides for an electronic apparatus for potentially improving the processing efficiency of a plurality of streams through resource management of a processor for image processing (e.g., a digital signal processor (DSP)), and a control method thereof.

As terms used in the embodiments of the present disclosure, general terms that may be currently used widely may have been selected as far as possible, in consideration of the functions described in the present disclosure. However, the terms may vary depending on the intention of those skilled in the art who work in the pertinent field, previous court decisions, the emergence of new technologies, and the like. Alternatively or additionally, there may be terms that may have been designated by the applicant on his own, and in such cases, the meaning of the terms may be described in the relevant descriptions in the present disclosure. Accordingly, the terms used in the present disclosure should be defined based on the meaning of the terms and the overall content of the present disclosure, but not just based on the names of the terms.

Alternatively or additional, in the present disclosure, expressions such as, but not limited to, "have," "may have," "include," and "may include" may denote the existence of such characteristics (e.g., elements such as numbers, functions, operations, and components), and may not exclude the existence of additional characteristics.

In addition, the expression "at least one of A and/or B" should be interpreted to mean any one of "A" or "B" or "A and B."

Further, the expressions "first," "second" and the like used in the present disclosure may be used to describe various elements regardless of any order and/or degree of importance. Alternatively or additionally, such expressions may be used only to distinguish one element from another element, and may not be intended to limit the elements.

It is to be understood that singular expressions include plural expressions, unless defined obviously differently in the context. Further, in the present disclosure, terms such as "include" and "consist of" should be construed as designating that there are such characteristics, numbers, steps, operations, elements, components, or a combination thereof described in the present disclosure, but not as excluding in advance the existence or possibility of adding one or more of other characteristics, numbers, steps, operations, elements, components, or a combination thereof.

In addition, in the present disclosure, the term "user" may refer to a person who uses an electronic apparatus and/or an apparatus using an electronic apparatus (e.g., an artificial intelligence (AI) electronic apparatus).

Hereinafter, various embodiments of the present disclosure are described with reference to the accompanying drawings.

Figure 1B:
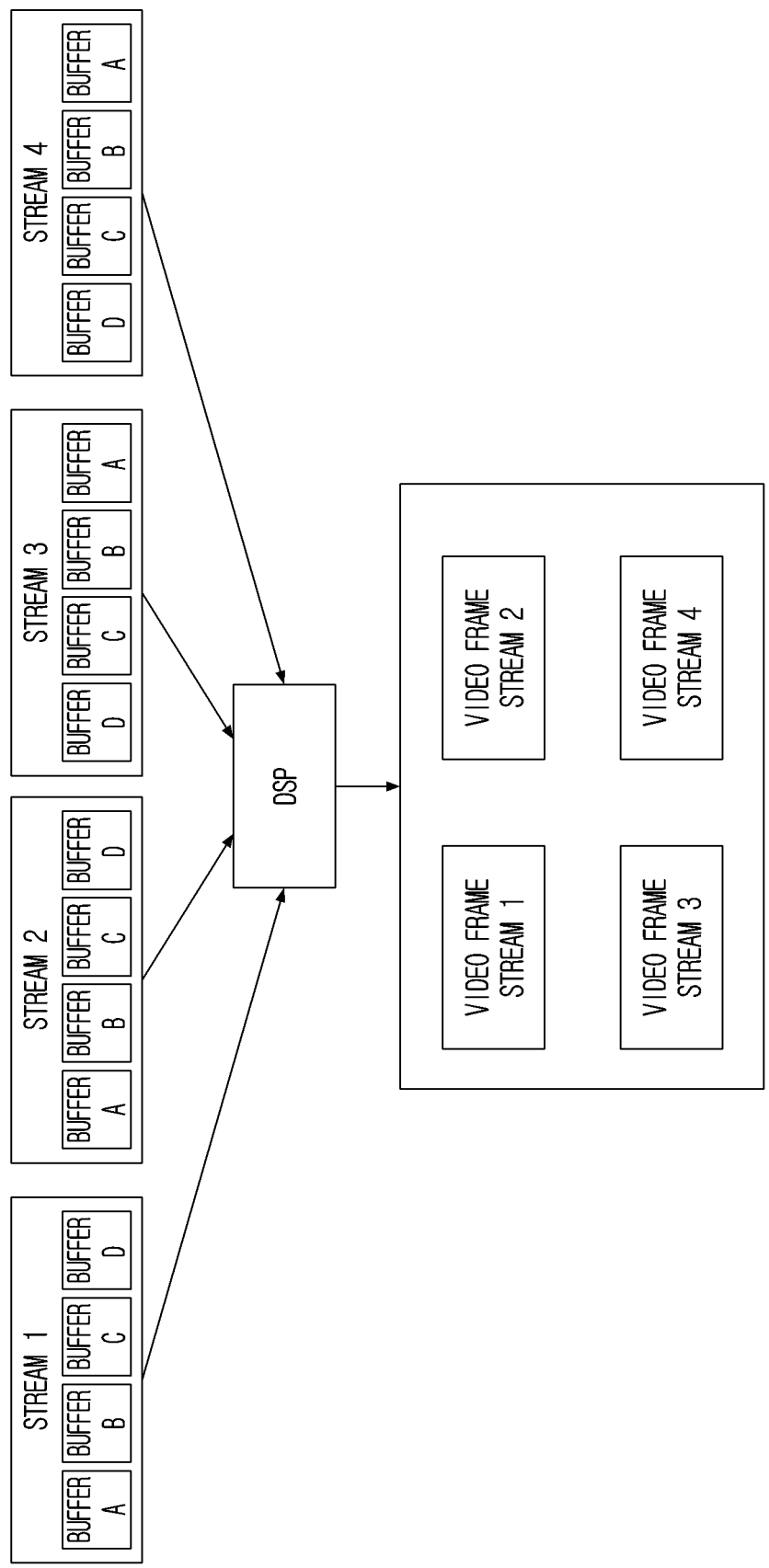
Figure 1C:
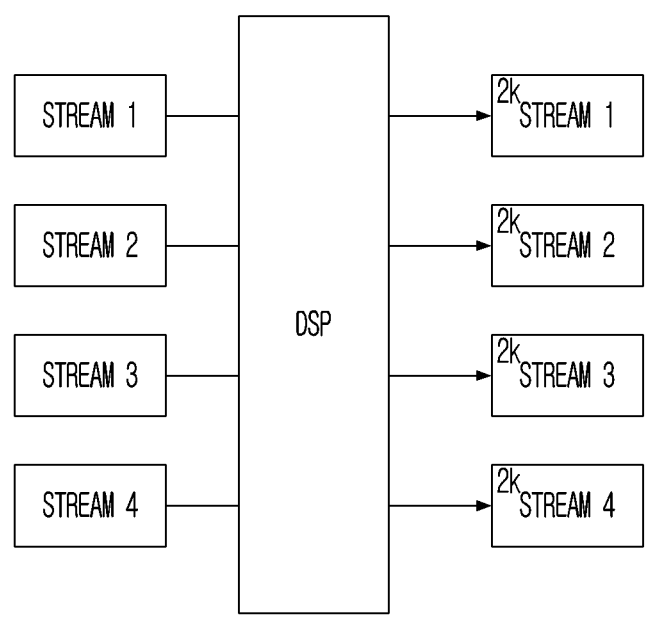

FIG. 1A to FIG. 1C are diagrams for illustrating a method of processing a plurality of streams, according to one or more embodiments of the present disclosure.

In an embodiment, an electronic apparatus may decode image data by using a DVDE codec illustrated in FIG. 1A. For example, the DVDE codec illustrated in FIG. 1A may be a type of multi format decoder. The DVDE codec shown in FIG. 1A is illustrated as having one stream, for purposes of explanation, however, the present disclosure is not limited in this regard. For example, the DVDE codec may be and/or may include a multi format decoder that may receive a plurality of streams, and/or decode the plurality of streams.

The DVDE codec may output the decoded image data to four separated buffers (e.g., first buffer A, second buffer B, third buffer C, and fourth buffer D) for optimization of the load to a memory such as, but not limited to, a double data rate (DDR) memory and latency.

The hardware, which may be and/or may include a VDEC interface, may generate one frame by relocating the image data stored in the four buffers, and then output the generated frame to a scaler (not shown).

The scaler may scale the received frame to correspond to the resolution of the display.

In an embodiment, the image data may be relocated by using a DSP instead of the hardware (e.g., a VDEC interface). In such an embodiment, an image frame may be acquired without the use of hardware such as, but not limited to, a VDEC interface.

In an embodiment when using a DSP, a plurality of streams may be processed, as illustrated in FIG. 1B. For example, as illustrated in FIG. 1C, the DSP may receive a first stream 1, a second stream 2, a third stream 3, and a fourth stream 4. Alternatively or additionally, the DSP may output the first stream 1 of a 2 K resolution, the second stream 2 of a 2 k resolution, the third stream 3 of a 2 k resolution, and the fourth stream 4 of a 2 k resolution.

In an optional or additional embodiment, when there is no sufficient margin in the use amount of the DSP compared to the performance of the DVDE codec, a limitation may be generated on the number of streams that may be relocated. In such an embodiment, even if playing of an additional stream is needed, an additional stream may not be played, and/or playing of a previous stream may have to be stopped.

Figure 2:
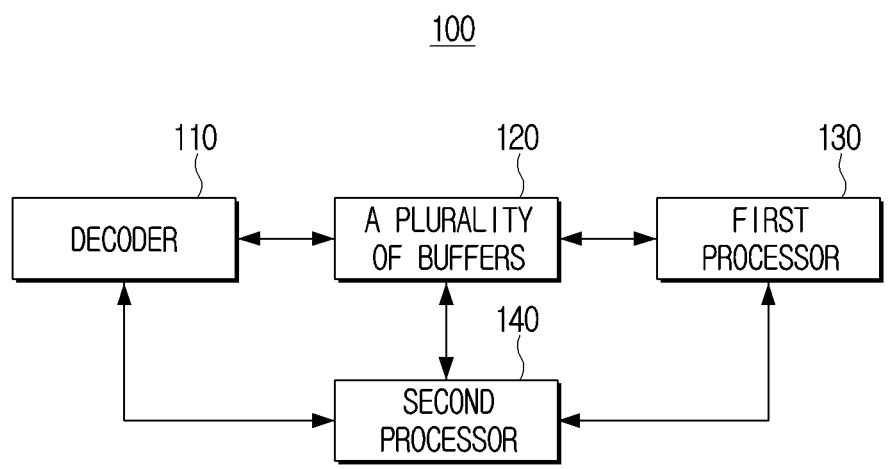
FIG. 2 is a block diagram illustrating a configuration of an electronic apparatus, according to one or more embodiments of the present disclosure.

FIG. 2 is a block diagram illustrating a configuration of the electronic apparatus 100, according to one or more embodiments of the present disclosure.

The electronic apparatus 100 may be and/or may include an apparatus that performs image processing of a plurality of streams. For example, the electronic apparatus 100 may be and/or may include an apparatus that may include, but not be limited to, a display such as a television (TV), a desktop personal computer (PC), a laptop computer, a video wall, a large format display (LFD), digital signage, a digital information display (DID), a projector display, a smartphone, a tablet PC, and the like. Alternatively or additionally, the electronic apparatus 100 may perform image processing of a plurality of streams, and then may display the plurality of streams that have gone through the image processing. Alternatively or additionally, the electronic apparatus 100 may be an apparatus that provides a plurality of streams that have gone through image processing to an apparatus including a display such as, but not limited to, a set top box (STB), and the like.

However, the present disclosure is not limited thereto, and any apparatus may be the electronic apparatus 100 if it may perform image processing of a plurality of streams.

According to FIG. 2, the electronic apparatus 100 may include a decoder 110, a plurality of buffers 120, a first processor 130, and a second processor 140.

The decoder 110 may decode a plurality of encoded streams. For example, the decoder 110 may decode a plurality of encoded streams through the DVDE codec standard.

However, the present disclosure is not limited thereto, and the decoder 110 may be implemented as a type of multi format decoder that may be configured to conform with various codec standards, such that the decoder 110 may receive a plurality of streams encoded using various codec standards and decode the received plurality of streams.

The plurality of buffers 120 may include a plurality of buffer groups corresponding to the plurality of streams. For example, the number of the plurality of buffers 120 may be a total of sixteen (16). In such an example, the plurality of buffers 120 may include four (4) groups and each group of the plurality of buffers 120 may include four buffers. However, the present disclosure is not limited thereto, and the plurality of buffers 120 may be implemented using other quantities and/or groupings of buffers. For example, the number of buffers included in one buffer group may vary according to design constraints.

In an embodiment, each of the plurality of buffers may store one stream. For example, the four (4) buffers included in one buffer group may divide and store one stream. Alternatively or additionally, data included in one stream may be sequentially stored in a manner wherein a first buffer from among the four buffers included in one buffer group may store information on a first pixel, a second buffer may store information on a second pixel that may be located next to the first pixel, a third buffer may store information on a third pixel that may be located next to the second pixel, and a fourth buffer may store information on a fourth pixel that may be located next to the third pixel. However, the present disclosure is not limited thereto, and various other methods may be used for storing one stream in one buffer group.

In an embodiment, the first processor 130 may acquire one frame by relocating decoded data output from each of the plurality of buffer groups. In an optional or additional embodiment, the first processor 130 may be implemented as a DSP. In such an embodiment, the first processor 130 may acquire one frame by relocating data sequentially received from four buffers included in a first group from among the plurality of buffer groups. Alternatively or additionally, the first processor 130 may acquire one frame by relocating data sequentially received from four buffers included in a second group among the plurality of buffer groups. For another example, the first processor 130 may acquire one frame by relocating data sequentially received from four buffers included in a third group among the plurality of buffer groups. For another example, the first processor 130 may acquire one frame by relocating data sequentially received from four buffers included in a fourth group among the plurality of buffer groups.

However, the present disclosure is not limited thereto, and the first processor 130 may have other configurations with which the first processor 130 may acquire a plurality of frames by relocating the plurality of streams. For example, the first processor 130 may be implemented as a central processing unit (CPU), and acquire a plurality of frames by relocating the plurality of streams by a software method.

In an embodiment, the second processor 140 may control the overall operations of the electronic apparatus 100. That is, the second processor 140 may be connected (e.g., communicatively coupled) with each component of the electronic apparatus 100 and may control the overall operations of the electronic apparatus 100. For example, the second processor 140 may be connected with components such as the decoder 110, the plurality of buffers 120, the first processor 130, and the like, and may control the operations of the electronic apparatus 100.

The at least one second processor 140 may be and/or may include, but not be limited to, one or more of a CPU, a graphics processing unit (GPU), an accelerated processing unit (APU), a many integrated core (MIC), a neural processing unit (NPU), a hardware accelerator, a machine learning accelerator, and the like. The at least one second processor 140 may control one or any combination of the other components of the electronic apparatus 100, and may perform operations related to communication and/or data processing. The at least one second processor 140 may execute one or more programs and/or instructions stored in a memory. For example, the at least one second processor 140 may perform methods according to one or more embodiments of the present disclosure by executing one or more instructions stored in the memory.

When a method, according to one or more embodiments of the present disclosure, includes a plurality of operations, the plurality of operations may be performed by one processor, and/or may be performed by a plurality of processors. For example, when a first operation, a second operation, and a third operation are performed by the method according to one or more embodiments, all of the first operation, the second operation, and the third operation may be performed by the first processor, and/or the first operation and the second operation may be performed by the first processor (e.g., a generic-purpose processor), and the third operation may be performed by a second processor (e.g., an AI-dedicated processor).

In an embodiment, at least one second processor 140 may be implemented as a single core processor including one core. Alternatively or additionally, the at least one second processor 140 may be implemented as one or more multicore processors including a plurality of cores (e.g., multicores of the same kind and/or multicores of different kinds). When the at least one second processor 140 is implemented as a multicore processor, each of the plurality of cores included in the multicore processor may include an internal memory of the processor such as a cache memory, an on-chip memory, and the like, and/or a common cache shared by the plurality of cores may be included in the multicore processor. Alternatively or additionally, each of the plurality of cores (and/or some of the plurality of cores) included in the multicore processor may independently read a program instruction for implementing a method according to one or more embodiments of the present disclosure and perform the instruction, and/or the plurality of entire cores (and/or some of the cores) may be linked with one another, and read a program instruction for implementing a method according to one or more embodiments of the present disclosure and perform the instruction.

When a method, according to one or more embodiments of the present disclosure, includes a plurality of operations, the plurality of operations may be performed by one core among the plurality of cores included in the multicore processor, and/or may be performed by the plurality of cores. For example, when the first operation, the second operation, and the third operation are performed by a method according to one or more embodiments, all of the first operation, the second operation, and the third operation may be performed by a first core included in the multicore processor, and/or the first operation and the second operation may be performed by the first core included in the multicore processor, and the third operation may be performed by a second core included in the multicore processor.

In some embodiments of the present disclosure, the at least one second processor 140 may be and/or may include, but not be limited to, a system on chip (SoC) in which at least one processor and other electronic components may be integrated, a single core processor, a multicore processor, cores included in a single core processor and/or a multicore processor, and the like. For example, the cores may be implemented as a CPU, a GPU, an APU, a MIC, an NPU, a hardware accelerator, a machine learning accelerator, and the like, but the embodiments of the present disclosure are not limited thereto. Hereinafter, the operations of the electronic apparatus 100 may be explained using the expression 'the second processor 140,' for convenience of explanation. However, the present disclosure is not limited, and the operation described as being performed by the second processor 140 may be understood to be operations performed by the electronic apparatus 100.

When playing of an additional stream is needed in addition to a plurality of streams that are already being played, the second processor 140 may identify an additional use rate of the first processor 130 necessary (e.g., sufficient) for playing the additional stream without stopping the playing of the streams that are already being played. For example, if an instruction for playing the stream 5 is executed while the first processor 130 is processing the stream 1, the stream 2, the stream 3, and the stream 4, the second processor 140 may identify the additional use rate of the first processor 130 for playing the stream 5 as 20%.

If the remaining (e.g., available) use rate of the first processor 130 is smaller than the additional use rate, the second processor 140 may control the first processor 130 to downscale at least one of the plurality of streams and/or the additional stream. For example, if the current use rate of the first processor 130 is 100%, the remaining (e.g., available) use rate of the first processor 130 is 0%, and the remaining (e.g., available) use rate is smaller than the additional use rate 20% for playing the stream 5, the second processor 140 may control the first processor 130 to downscale at least one of the plurality of streams and/or the additional stream.

In an embodiment, the first processor 130 may perform downscaling by a method of controlling reading from the buffers. For example, if a case wherein the first processor 130 receives decoded data from a buffer A to a buffer D is assumed with reference to FIG. 1A, the first processor 130 may perform downscaling by a method of reading information on the first pixel from the buffer A, not reading information on the second pixel next to the first pixel from the buffer B, reading information on the third pixel next to the second pixel from the buffer C, and not reading information on the fourth pixel next to the third pixel from the buffer D.

However, the present disclosure is not limited thereto, and there may be any various methods for the first processor 130 to perform downscaling.

Through the downscaling described above, the remaining (e.g., available) use rate of the first processor 130 may be heightened (e.g., increased).

In an embodiment, the second processor 140 may identify at least one of the number of the streams to be downscaled and a downscaling rate of the streams to be downscaled based on the remaining (e.g., available) use rate and the additional use rate.

For example, if the first processor 130 processes the stream 1, the stream 2, the stream 3, and the stream 4 and the current use rate of the first processor 130 is 100%, the remaining (e.g., available) use rate of the first processor 130 is 0%, and the remaining (e.g., available) use rate is smaller than the additional use rate 20% for playing the stream 5, the second processor 140 may heighten (e.g., increase) the remaining (e.g., available) use rate by downscaling the stream 4. For example, the second processor 140 may identify the downscaling rate of the stream 4 to heighten the remaining (e.g., available) use rate to 20%. Alternatively or additionally, if the remaining (e.g., available) use rate becomes higher by 10% each time through downscaling of one stream, the second processor 140 may downscale two streams.

If at least one of the plurality of streams and/or the additional stream is downscaled, based on the downscaling rate, to a smaller resolution than a predetermined lowest resolution threshold, the second processor 140 may downscale at least one of the plurality of streams and/or the additional stream to the predetermined lowest resolution threshold, and increase the number of the streams to be downscaled. For example, when downscaling the stream 4 to ¼, if the stream 4 is downscaled to a smaller resolution than the predetermined lowest resolution threshold, the second processor 140 may downscale the stream 4 to the predetermined lowest resolution threshold, and additionally downscale the stream 3. If a stream is downscaled to a smaller resolution than the predetermined lowest resolution threshold, the image quality may become quite low even if upscaling is performed later. Accordingly, the image quality of a downscaled stream may be maintained to be of a specific level or higher through an operation as described above.

If the remaining (e.g., available) use rate of the first processor 130 is smaller than the additional use rate, the second processor 140 may control the first processor 130 to downscale at least one of the plurality of streams and/or the additional stream based on the resolutions of each of the plurality of streams and the resolution of the additional stream. For example, if the remaining (e.g., available) use rate of the first processor 130 is smaller than the additional use rate, the second processor 140 may control the first processor 130 to downscale the stream having the highest resolution from among the resolutions of each of the plurality of streams and the resolution of the additional stream.

If the remaining (e.g., available) use rate of the first processor 130 is smaller than the additional use rate, the second processor 140 may control the first processor 130 to downscale one of the plurality of streams. For the additional stream, the user may have requested the playing of the additional stream, and thus it may be deemed that the user's intention of viewing is high, and accordingly, the second processor 140 may control the first processor 130 to downscale one of the plurality of streams without downscaling the additional stream.

In an embodiment, the second processor 140 may include a resource manager configured to identify the remaining (e.g., available) use rate and the additional use rate. Alternatively or additionally, the second processor 140 may include a sampling operation part configured to identify a downscaling rate based on the remaining (e.g., available) use rate and the additional use rate. For example, the resource manager may identify the remaining (e.g., available) use rate and the additional use rate, and the sampling operation part may identify a downscaling rate based on the remaining (e.g., available) use rate and the additional use rate may be implemented in a hardware configuration. However, the present disclosure is not limited thereto, and the second processor 140 may control the first processor 130 based on a software module performing operations of each of the resource manager and the sampling operation part.

The electronic apparatus 100 may further include at least one scaler, and the second processor 140 may control the at least one scaler to upscale at least one downscaled stream. In an embodiment, the at least one scaler may perform the upscaling using a neural network model.

The second processor 140 may control the at least one scaler to upscale at least one downscaled stream based on the resolution of the display of the electronic apparatus 100. Alternatively or additionally, the second processor 140 may control the at least one scaler to upscale at least one downscaled stream based on the resolution of a display apparatus, and provide the upscaled stream to the display apparatus. Hereinafter, the resolution of the display of the electronic apparatus 100 and/or the display apparatus may be referred to as a target resolution.

Alternatively or additionally, the second processor 140 may upscale at least one downscaled stream by using a scaler corresponding to the target resolution from among the at least one scaler. For example, if the target resolution is full high-definition (FHD), the second processor 140 may upscale the at least one downscaled stream by using a first scaler. For another example, if the target resolution is ultra high-definition (UHD), the second processor 140 may upscale the at least one downscaled stream by using a second scaler. In an embodiment, each of the first scaler and the second scaler may use a neural network model to perform the upscaling.

Alternatively or additionally, the second processor 140 may use one scaler from among the at least one scaler based on at least one of the resolution of a downscaled stream and/or the target resolution. For example, if the upscaling rate is smaller than a predetermined rate based on the resolution of a downscaled stream and the target resolution, the second processor 140 may upscale the downscaled stream by using a third scaler. Alternatively or additionally, if the upscaling rate is greater than or equal to the predetermined rate, the second processor 140 may upscale the downscaled stream by using a fourth scaler.

Alternatively or additionally, the second processor 140 may use one scaler among the at least one scaler based on the type of a downscaled stream. For example, if the type of a downscaled stream is a movie type, the second processor 140 may upscale the downscaled stream by using a fifth scaler. Alternatively or additionally, if the type of a downscaled stream is an advertisement type, the second processor 140 may upscale the downscaled stream by using a sixth scaler.

The operations for selecting at least one scaler described above may be implemented in any of various combined forms.

In an embodiment, functions related to AI, according to the present disclosure, may be operated through the second processor 140 and the memory.

The second processor 140 may consist of one processor and/or a plurality of processors. In an embodiment, the one processor and/or the plurality of processors may be and/or may include generic-purpose processors (e.g., a CPU, an AP, a DSP, and the like), graphics-dedicated processors (e.g., a GPU, a vision processing unit (VPU)), AI-dedicated processors (e.g., an NPU), and the like.

The one processor and or the plurality of processors may perform control to process input data according to predefined operation rules and/or an AI model stored in the memory. Alternatively or additionally, in case the one processor and/or plurality of processors are AI-dedicated processors, the AI-dedicated processors may be designed as a hardware structure specified for processing of a specific AI model. The predefined operation rules and/or the AI model may be characterized in that the predefined operation rules and/or the AI model may be made through learning.

As used herein, being made through learning may refer to a basic artificial intelligence model that may be made by training the model using a plurality of learning data by a learning algorithm, and predefined operation rules and/or an AI model set to perform desired characteristics (e.g., purposes) are thereby made. Such learning may be performed in an apparatus itself wherein artificial intelligence may be performed according to the present disclosure, and/or performed through a separate server and/or system. Examples of learning algorithms that may be used to make the AI model may include, but not be limited to, supervised learning, unsupervised learning, semi-supervised learning, and reinforcement learning. However, learning algorithms used in the present disclosure may not be limited to the aforementioned examples.

An artificial intelligence model, according to an embodiment, may consist of a plurality of neural network layers. Each of the plurality of neural network layers may have a plurality of weight values, and may perform a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value and/or a cost value acquired at the artificial intelligence model during a learning process may be reduced and/or minimized.

An artificial neural network may include, but not be limited to, a deep neural network (DNN), a convolutional neural network (CNN), a deep neural network (DNN), a recurrent neural network (RNN), a restricted Boltzmann Machine (RBM), a deep belief network (DBN), a bidirectional recurrent deep neural network (BRDNN), a generative adversarial network (GAN), or deep Q-networks, and the like. However, the present disclosure may not be limited to the aforementioned examples.

Figure 3:
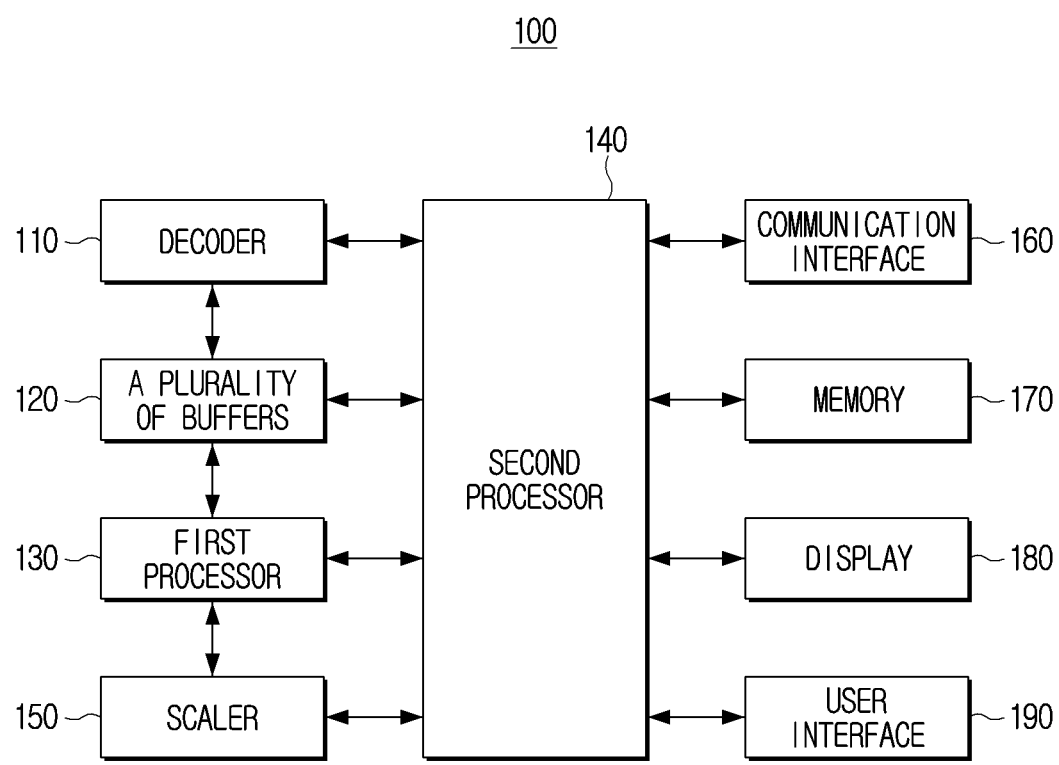
FIG. 3 is a block diagram illustrating an example configuration of an electronic apparatus, according to one or more embodiments of the present disclosure.

FIG. 3 is a block diagram illustrating an example configuration of the electronic apparatus 100, according to one or more embodiments of the present disclosure. Referring to FIG. 3, the electronic apparatus 100 may include a decoder 110, a plurality of buffers 120, a first processor 130, and a second processor 140. Alternatively or additionally, according to FIG. 3, the electronic apparatus 100 may further include a scaler 150, a communication interface 160, a memory 170, a display 180, and a user interface 190. The electronic apparatus 100 of FIG. 3 may include and/or may be similar in many respects to the electronic apparatus 100 described above with reference to FIG. 2, and may include additional features not mentioned above. To the extent that the components of the electronic apparatus 100 of FIG. 3 include and/or are similar in many respects to corresponding components of the electronic apparatus 100 of FIG. 2, a repeated explanation may be omitted for the sake of brevity.

The communication interface 160 may be configured to perform communications with various types of external apparatuses according to various types of communication methods. For example, the electronic apparatus 100 may perform communication with a streaming server, and the like, through the communication interface 160.

In an embodiment, the communication interface 160 may include, but not be limited to, at last one of a Wireless-Fidelity (Wi-Fi) module, a Bluetooth™ module, an Infrared Data Association (IrDA) module, a near field communication (NFC) module, a wireless communication module, and the like. For example, each communication module may be implemented in a form of at least one hardware chip.

For another example, a Wi-Fi module and a Bluetooth module may perform communications by a Wi-Fi method and a Bluetooth method, respectively. In the case of using a Wi-Fi module and/or a Bluetooth module, various types of connection information, such as, but not limited to, a service set identifier (SSID) and/or a session key may be transmitted and/or received first, and a communication connection may be performed by using the connection information. Subsequently, various types of information may be transmitted and/or received thereafter. An infrared communication module may perform communication, according to an IrDA technology, to transmit and/or receive data in a near field wirelessly by using infrared rays between visible rays and millimeter waves.

In an embodiment, a wireless communication module may include at least one communication chip that may perform communications according to various wireless communication protocols such as, but not limited to, Zigbee, 3rd Generation (3G), 3rd Generation Partnership Project (3GPP), Long Term Evolution (LTE), LTE Advanced (LTE-A), 4th Generation (4G), 5th Generation (5G), 5G New Radio (NR), and the like.

Alternatively or additionally, the communication interface 160 may include a wired communication interface such as an high-definition multimedia interface (HDMI), a DisplayPort (DP) interface, a Thunderbolt interface, a universal serial bus (USB) interface, a Red Green and Blue (RGB) interface, a D-subminiature (D-SUB) interface, a digital visual interface (DVI), and the like.

Alternatively or additionally, the communication interface 160 may include at least one of a local area network (LAN) module, an Ethernet module, and/or a wired communication module for performing communication by using a pair cable, a coaxial cable, an optical fiber cable, and the like.

The memory 170 may refer to hardware that may store information such as programs, data, and the like, in an electronic and/or a magnetic form so that the second processor 140, and the like may access the information. For example, the memory 170 may be implemented as at least one hardware from among a non-volatile memory, a volatile memory, a flash memory, a hard disc drive (HDD), a solid state drive (SSD), a random-access memory (RAM), a read-only memory (ROM), and the like.

In an embodiment, the memory 170 may store at least one instruction necessary for the operations of the electronic apparatus 100 and/or the second processor 140. As used herein, an instruction may be a code unit instructing the operations of the electronic apparatus 100 and/or the second processor 140, which may have been drafted in a machine language that may be understood (e.g., executed) by a computer. Alternatively or additionally, the memory 170 may store, as an instruction set, a plurality of instructions that may perform specific tasks of the electronic apparatus 100 and/or the second processor 140.

Alternatively or additionally, the memory 170 may store data in bit and/or byte units that may indicate characters, numbers, images, and the like. For example, the memory 170 may store an upscaling module, and the like.

In an embodiment, the memory 170 may be accessed by the second processor 140. For example, the second processor 140 may perform at least one of reading, recording, correction, deletion, update, and the like of an instruction, an instruction set, and/or data.

The display 180 may be configured to display an image. In an embodiment, the display 180 may be implemented as at least one of various forms of displays such as, but not limited to, a liquid crystal display (LCD), an organic light emitting diode (OLED) display, a plasma display panel (PDP), and the like. The display 180 may include driving circuits that may be implemented in forms such as, but not limited to, an amorphous silicon (a-Si) thin film transistor (TFT) display, a low temperature poly silicon (LTPS) TFT, an organic TFT (OTFT), and the like. Alternative or additionally, the display 180 may include a backlight unit, and the like. In an embodiment, the display 180 may be implemented as a touch screen combined with a touch sensor, a flexible display, a 3-dimensional (3D) display, and the like.

The user interface 190 may be implemented as a button, a touch pad, a mouse, and a keyboard, and the like. Alternatively or additionally, the user interface 190 may be implemented as a touch screen that may perform a display function and a manipulation input function together. In an embodiment, the button may be at least one of various types of buttons such as, but not limited to, a mechanical button, a touch pad, a wheel, and the like, that may be formed in any one of multiple areas of the electronic apparatus 100, such as, but not limited to, a front surface part and/or a side surface part, a rear surface part, and the like, of the exterior of the main body of the electronic apparatus 100.

In an optional or additional embodiment, the electronic apparatus 100 may further include a microphone, a speaker, a camera, and the like.

For example, the microphone may be configured for receiving input of a sound and/or converting the sound into an audio signal. Alternatively or additionally, the microphone may be electronically connected with the second processor 140, and may receive a sound by control by the second processor 140.

For example, the microphone may be formed as an integrated type that may be integrated to the upper side, the front surface direction, the side surface direction, and the like of the electronic apparatus 100. Alternatively or additionally, the microphone may be provided in a separate remote control, and the like from the electronic apparatus 100. In such an embodiment, the remote control may receive a sound through the microphone, and/or may provide the received sound to the electronic apparatus 100.

The microphone may include various components such as a microphone that may collect a sound in an analog form, an amplifier circuit that may amplify the collected sound, an analog-to-digital (A/D) conversion circuit that may sample the amplified sound and may convert the sound into a digital signal, a filter circuit that may remove noise components from the converted digital signal, and the like.

In an embodiment, the microphone may also be implemented in a form of a sound sensor. For example, the microphone may be of any type that may collect a sound.

In an embodiment, the speaker may be configured to output various kinds of audio data processed at the second processor 140, and/or various kinds of notification sounds and/or voice messages, and the like.

In optional or additional embodiments, the electronic apparatus 100 may include a camera. The camera may be configured for photographing (e.g., capturing) a still image and/or a moving image. For example, the camera may photograph a still image at a specific time point. For another example, the camera may photograph still images consecutively.

The camera may include at least one of a lens, a shutter, a diaphragm, a solid imaging element, an analog front end (AFE), and a timing generator (TG). For example, the shutter may adjust the time when a light reflected on a subject may enter the camera. The diaphragm may adjust the amount of the light introduced into the lens by mechanically increasing and/or decreasing the size of the opening through which the light enters. When the light reflected on the subject is accumulated as photo charges, the solid imaging element may output the phase due to the photo charges as an electronic signal. The TG may output a timing signal for reading out the pixel data of the solid imaging element. The AFE may sample and/or digitize the electronic signal output from the solid imaging element.

In some embodiments, the electronic apparatus 100 may process a plurality of streams by various methods through resource management of a processor for image processing (e.g., a DSP). Accordingly, user convenience may be improved when compared to related electronic apparatuses. Alternatively or additionally, the electronic apparatus 100 may minimize image quality degradation by upscaling at least one downscaled stream by using at least one scaler using a neural network model.

Hereinafter, operations of the electronic apparatus 100 may be described with reference to FIGS. 4 to 7. In FIGS. 4 to 7, individual embodiments may be explained for the convenience of explanation. However, the individual embodiments depicted in FIGS. 4 to 7 may be carried out in any combined states.

Figure 4:
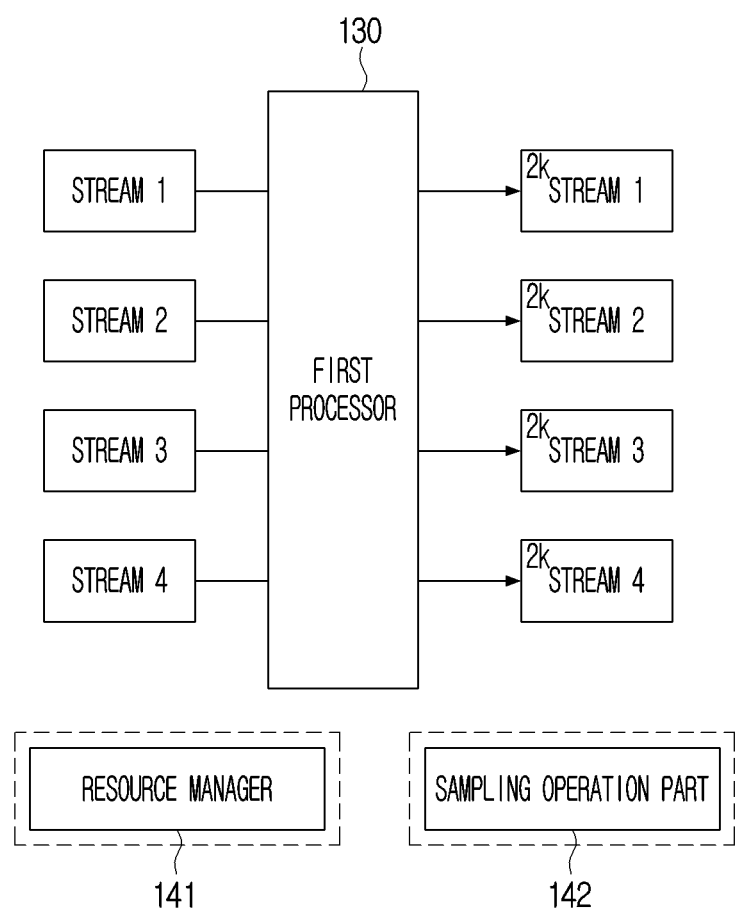
FIG. 4 is a diagram for schematically illustrating an operation of a first processor, according to one or more embodiments of the present disclosure.

FIG. 4 is a diagram for schematically illustrating an operation of the first processor 130, according to one or more embodiments of the present disclosure.

The first processor 130 may acquire one frame by relocating decoded data output from each of the plurality of buffer groups. For example, as shown in FIG. 4, the first processor 130 may receive decoded data from four buffers included in the first buffer group (e.g., stream 1), and may acquire the stream 1 of a 2 k resolution by relocating the decoded data. For another example, the first processor 130 may receive decoded data from four buffers included in the second buffer group (e.g., stream 2), and may acquire the stream 2 of a 2 k resolution by relocating the decoded data. For another example, the first processor 130 may receive decoded data from four buffers included in the third buffer group (e.g., stream 3), and may acquire the stream 3 of a 2 k resolution by relocating the decoded data. For another example, the first processor 130 may receive decoded data from four buffers included in the fourth buffer group (e.g., stream 4), and may acquire the stream 4 of a 2 k resolution by relocating the decoded data.

However, the present disclosure is not limited thereto, and the number of the streams processed by the first processor 130, the resolutions of the processed streams, and the like may vary in numerous ways without deviating from the scope of the present disclosure.

As shown in FIG. 4, the second processor 140 may include a resource manager 141 and/or a sampling operation part 142. The resource manager 141 may identify the current use rate of the first processor 130, and/or identify the remaining (e.g., available) use rate based on the current use rate. Alternatively or additionally, the resource manager 141 may identify the additional use rate of the first processor 130 necessary (e.g., sufficient) for playing an additional stream. The sampling operation part 141 may identify a downscaling rate based on the remaining (e.g., available) use rate and the additional use rate.

Figure 5:
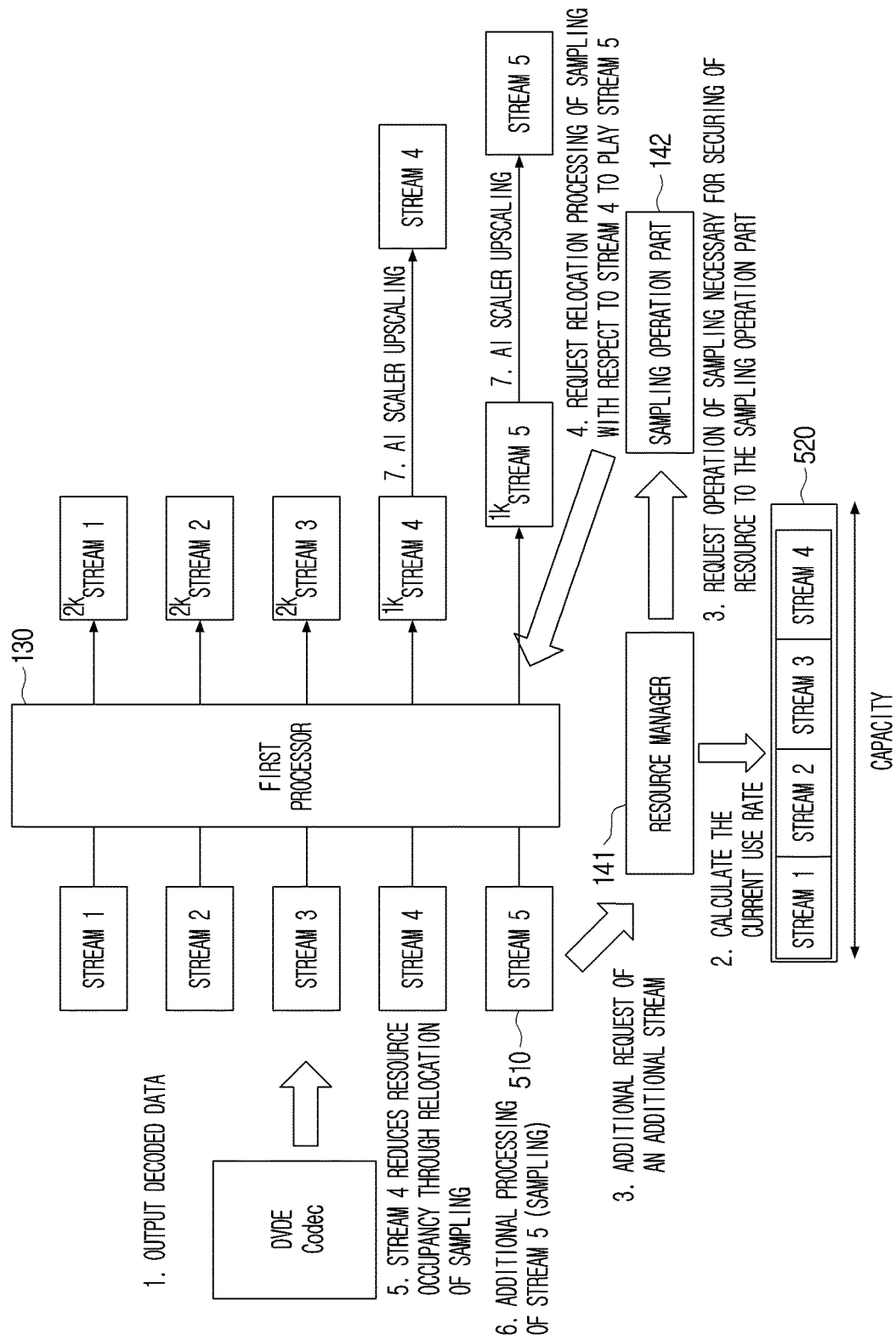
FIGS. 5 to 7 are diagrams for illustrating resource management of a first processor, according to one or more embodiments of the present disclosure.
Figure 6:
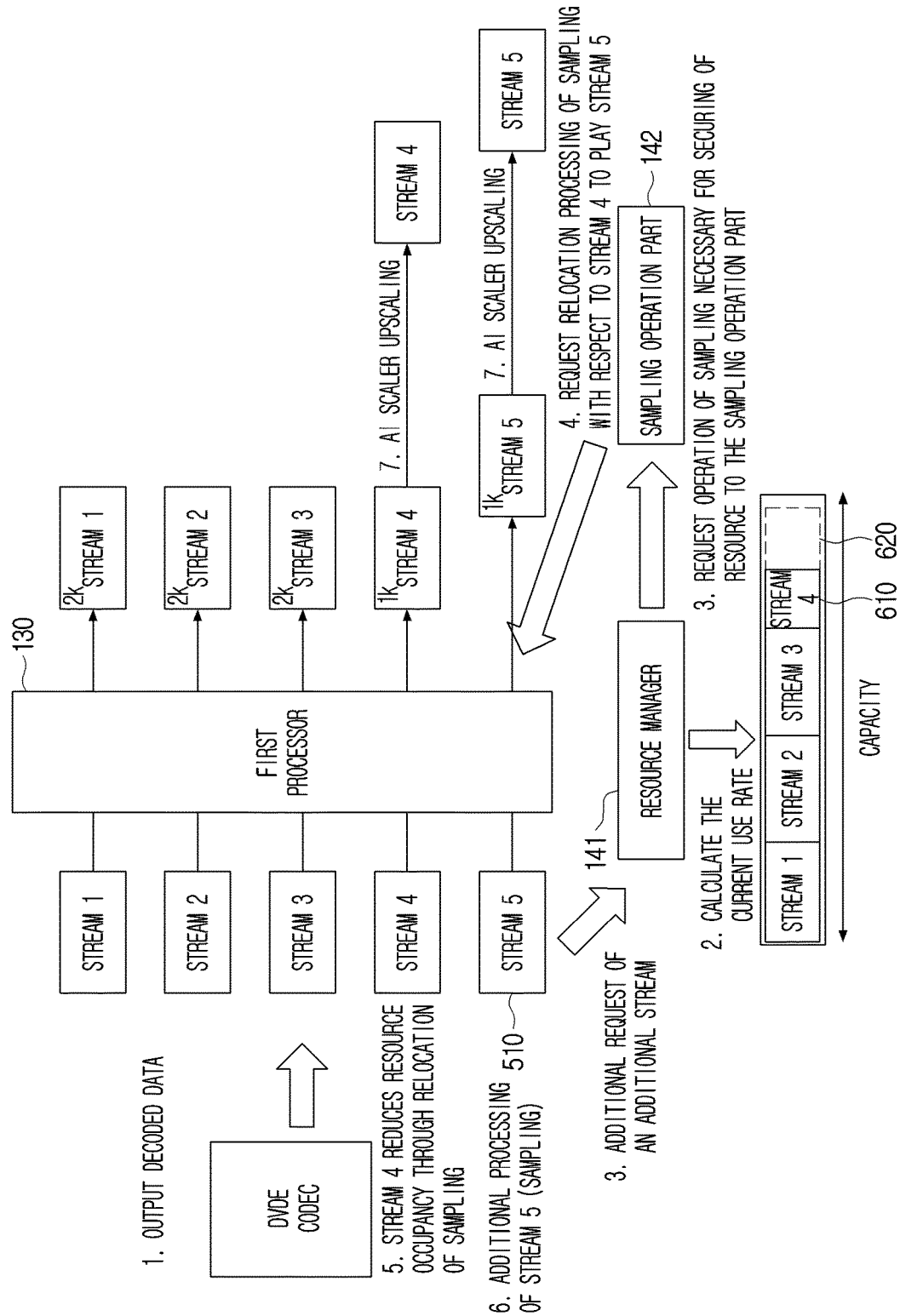
Figure 7:
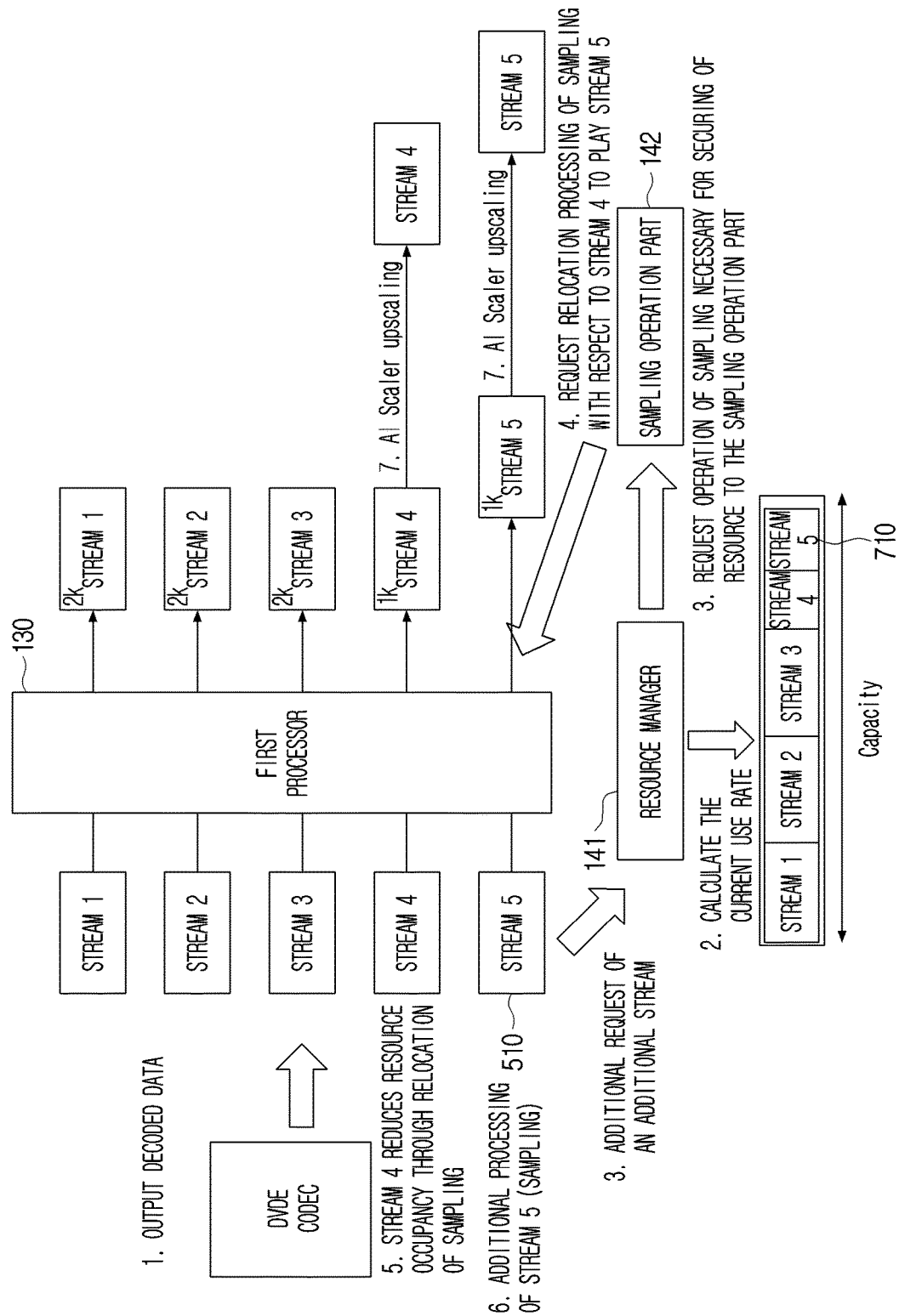

FIGS. 5 to 7 are diagrams for illustrating resource management of the first processor 130, according to one or more embodiments of the present disclosure.

The decoder 110 may decode a plurality of streams. For example, as shown in FIG. 5, the decoder 110 may output the stream 1, the stream 2, the stream 3, and the stream 4. Although the streams are indicated in FIG. 5 as the stream 1, the stream 2, the stream 3, and the stream 4 for the convenience of explanation, the plurality of streams may be respectively stored in the plurality of buffer groups. Alternatively or additionally, each of the plurality of streams may be in a decoded state.

The first processor 130 may acquire one frame by relocating the plurality of streams output from each of the plurality of buffer groups. For example, the first processor 130 may relocate the plurality of streams output from each of the plurality of buffer groups, and output the stream 1 of a 2 k resolution, the stream 2 of a 2 k resolution, the stream 3 of a 2 k resolution, and the stream 4 of a 2 k resolution.

The resource manager 141 may identify the current use rate 520 of the first processor 130, and may identify the remaining (e.g., available) use rate of the first processor 130 based on the current use rate. For example, if the current use rate is 100%, the resource manager 141 may identify the remaining (e.g., available) use rate of the first processor 130 as 0%.

Subsequently, if an instruction for playing an additional stream is received, the resource manager 141 may identify an additional use rate necessary (e.g., sufficient) for playing the additional stream, and request an operation of a downscaling rate for securing a resource to the sampling operation part 142. The sampling operation part 142 may identify the downscaling rate based on the remaining (e.g., available) use rate and the additional use rate. For example, if an instruction for playing a stream 5 (510) is received, the resource manager 141 may identify the additional use rate necessary (e.g., sufficient) for playing the stream 5 as 20%, and the sampling operation part 142 may identify the downscaling rate based on the remaining (e.g., available) use rate 0% and the additional use rate 20%.

The sampling operation part 142 may transmit a signal for downscaling at least one of the plurality of streams or the additional stream to the first processor 130. For example, the sampling operation part 142 may transmit a signal for relocating the stream 4 and the stream 5 to a 1 k resolution to the first processor 130.

The first processor 130 may relocate the stream 4 to a 1 k resolution as shown in FIG. 6, and accordingly, the use rate 610 of processing the stream 4 in the use rate of the first processor 130 may be reduced to half, and the remaining (e.g., available) use rate may be secured as the remaining (e.g., available) use rate 620.

When the remaining (e.g., available) use rate is secured, the first processor 130 may relocate the stream 5 to a 1 k resolution, as shown in FIG. 7, and accordingly, the remaining (e.g., available) use rate of the first processor 130 may be converted to the use rate 710 of processing the stream 5.

The electronic apparatus 100 may further include at least one scaler 150, and at least one downscaled stream may be upscaled by the at least one scaler 150.

For example, the first scaler among the at least one scaler 150 may receive the stream 4 of a 1 k resolution and upscale the stream to a 2 k resolution, and the second scaler among the at least one scaler 150 may receive the stream 5 of a 1 k resolution and upscale the stream to a 2 k resolution. In an embodiment, the first scaler and the second scaler may use a neural network model for performing the upscaling.

Through the operations described above, the first processor 130 may reduce quality degradation through scalers using a neural network model, while processing 5 streams.

Although FIGS. 5 to 7 describe a case in which there is one additional stream, the present disclosure is not limited thereto. For example, in case where there are two additional streams, the first processor 130 may relocate the stream 3 and the stream 4 to a 1 k resolution, and relocate the additional stream 5 and the additional stream 6 to a 1 k resolution. In such an embodiment, the stream 3 of a 1 k resolution, the stream 4 of a 1 k resolution, the stream 5 of a 1 k resolution, and the stream 6 of a 1 k resolution may be upscaled to a 2 k resolution through four scalers.

FIG. 8 is a flow chart for illustrating a control method of an electronic apparatus, according to one or more embodiments of the present disclosure.

A plurality of streams may be decoded in operation S810. The plurality of streams may be respectively stored in a plurality of buffer groups, in operation S820. In operation S830, a first processor included in the electronic apparatus 100 may acquire one frame by relocating decoded data output from each of the plurality of buffer groups. In operation S840, a second processor of the electronic apparatus 100, when the playing of an additional stream is needed, may identify an additional use rate of the first processor necessary (e.g., sufficient) for playing the additional stream. If the remaining (e.g., available) use rate of the first processor is smaller than the additional use rate, the second processor may control the first processor to downscale at least one of the plurality of streams or the additional stream, in operation S850.

In operation S850, at least one of the number of the streams to be downscaled and a downscaling rate of the streams to be downscaled may be identified based on the remaining (e.g., available) use rate and the additional use rate.

Alternatively or additionally, in operation S850, if at least one of the plurality of streams and/or the additional stream is downscaled to smaller than a predetermined lowest resolution threshold based on the downscaling rate, at least one of the plurality of streams and/or the additional stream may be downscaled to the predetermined lowest resolution threshold, and the number of the streams to be downscaled may be increased.

In an embodiment, in operation S850, if the remaining (e.g., available) use rate of the first processor is smaller than the additional use rate, the first processor may be controlled to downscale at least one of the plurality of streams and/or the additional stream based on the resolutions of each of the plurality of streams and the resolution of the additional stream.

Alternatively or additionally, in operation S850, if the remaining (e.g., available) use rate of the first processor is smaller than the additional use rate, the first processor may be controlled to downscale one of the plurality of streams.

In an embodiment, the second processor may include a resource manager configured to identify the remaining (e.g., available) use rate and the additional use rate, and a sampling operation part configured to identify a downscaling rate based on the remaining (e.g., available) use rate and the additional use rate.

Alternatively or additionally, the control method may further include controlling the at least one scaler to upscale the at least one downscaled stream.

In an embodiment, the at least one scaler may be configured to use a neural network model.

In an embodiment, in the decoding operation S810, the plurality of streams may be decoded through a multi format decoder.

Alternatively or additionally, each of the plurality of buffer groups may include four buffers.

According to one or more embodiments of the present disclosure as above, an electronic apparatus may process a plurality of streams by various methods through resource management of a processor for image processing (e.g., a DSP), and thus user convenience may be improved, when compared to related electronic apparatuses.

That is, as the electronic apparatus downscales and processes at least one of the plurality of streams, the number of the plurality of streams is increased, and thus contents that a user may view at the same time may be increased.

Alternatively or additionally, the electronic apparatus may minimize image quality degradation by upscaling the at least one downscaled stream by using at least one scaler using a neural network model.

According to one or more embodiments of the present disclosure, the various embodiments described above may be implemented as software including instructions stored in machine-readable storage media, which may be read by machines (e.g., computers). As used herein, the machines may refer to apparatuses that call instructions stored in a storage medium, and may operate according to the called instructions. Alternatively or additionally, the apparatuses may include the electronic apparatus according to the embodiments disclosed herein (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' may refer to a storage medium that does not include signals, and is tangible, but does not indicate whether data is stored in the storage medium semi-permanently or temporarily.

Alternatively or additionally, according to one or more embodiments of the present disclosure, methods according to the various embodiments disclosed herein may be provided while being included in a computer program product. A computer program product may refer to a product, which may be traded between a seller and a buyer. A computer program product may be distributed in the form of a storage medium that may be readable by machines (e.g., a compact disc read only memory (CD-ROM)), and/or distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to one or more embodiments of the present disclosure, the various embodiments described above may be implemented in a recording medium that may be read by a computer or an apparatus similar to a computer, by using software, hardware, or a combination thereof. In some cases, the embodiments described in the present disclosure may be implemented as a processor itself. According to implementation by software, the embodiments such as procedures and functions described in the present disclosure may be implemented as separate software modules. Each of the software modules may perform one or more functions and operations described in the present disclosure.

In an embodiment, computer instructions for performing processing operations of an apparatus according to the aforementioned various embodiments may be stored in a non-transitory computer-readable medium. Computer instructions stored in such a non-transitory computer-readable medium make the processing operations of an apparatus according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM, and the like.

Alternatively or additionally, each of the components (e.g., a module or a program) according to the aforementioned various embodiments may consist of a singular object or a plurality of objects. In addition, among the aforementioned corresponding sub components, some sub components may be omitted, or other sub components may be further included in the various embodiments. Alternatively or additionally, some components (e.g., a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Alternatively or additionally, at least some of the operations may be executed in a different order, omitted, and/or other operations may be added.

In addition, while embodiments of the present disclosure have been shown and described, the present disclosure is not limited to the aforementioned specific embodiments. It may be apparent that various modifications may be made by those having ordinary skill in the technical field to which the present disclosure belongs, without departing from the scope of the present disclosure as claimed by the appended claims. Further, it is intended that such modifications are not to be interpreted independently from the technical idea or prospect of the present disclosure.

What is claimed is:

1. An electronic apparatus, comprising:
a decoder configured to decode a plurality of streams;
a plurality of buffers divided into a plurality of buffer groups corresponding to the plurality of streams;
a first processor configured to acquire one frame by relocating decoded data output from each of the plurality of buffer groups; and
at least one second processor communicatively coupled with the decoder, the plurality of buffers, and the first processor, and configured to control the electronic apparatus,
wherein the at least one second processor is further configured to:
identify an additional use rate of the first processor sufficient for processing an additional stream, based on a first determination that the additional stream in addition to the plurality of streams is to be processed;
determine whether the additional use rate of the first processor exceeds an available use rate of the first processor;
identify a downscaling rate based on the available use rate of the first processor and the additional use rate of the first processor; and
control the first processor to downscale at least one downscaled stream of the additional stream and each of the plurality of streams to the downscaling rate, based on a second determination that the additional use rate of the first processor exceeds the available use rate of the first processor.

2. The electronic apparatus of claim 1, wherein the at least one second processor is further configured to:
identify the number of the at least one downscaled stream, based on the available use rate of the first processor and the additional use rate of the first processor.

3. The electronic apparatus of claim 1, wherein the at least one second processor is further configured to:
based on a third determination that a resolution of the at least one downscaled stream is smaller than a predetermined lowest resolution threshold, downscale the at least one downscaled stream to the predetermined lowest resolution threshold, and increase a number of the at least one downscaled stream.

4. The electronic apparatus of claim 1, wherein the at least one second processor is further configured to:
control the first processor to downscale the at least one downscaled stream, based on the second determination that the additional use rate of the first processor exceeds the available use rate of the first processor, and according to respective resolutions of each stream of the at least one downscaled stream.

5. The electronic apparatus of claim 1, wherein the at least one second processor is further configured to:
control the first processor to downscale at least one of the plurality of streams, based on the second determination that the additional use rate of the first processor exceeds the available use rate of the first processor.

6. The electronic apparatus of claim 1, wherein the at least one second processor comprises:
a resource manager configured to identify the available use rate and the additional use rate; and
a sampling operation part configured to identify the downscaling rate based on the available use rate and the additional use rate.

7. The electronic apparatus of claim 1, further comprising:
at least one scaler,
wherein the at least one second processor is further configured to control the at least one scaler to upscale the at least one downscaled stream.

8. The electronic apparatus of claim 7, wherein the at least one scaler is configured to use a neural network model.

9. The electronic apparatus of claim 1, wherein the decoder comprises a multi-format decoder.

10. The electronic apparatus of claim 1, wherein each buffer of the plurality of buffers comprises four buffers.

11. A control method of an electronic apparatus, the control method comprising:
decoding a plurality of streams;
storing the plurality of streams in a corresponding plurality of buffer groups;
acquiring, by a first processor of the electronic apparatus, one frame by relocating decoded data output from each of the plurality of buffer groups;
identifying, by a second processor of the electronic apparatus, an additional use rate of the first processor sufficient for processing an additional stream, based on determining that the additional stream in addition to the plurality of streams is to be processed;
determining whether the additional use rate of the first processor exceeds an available use rate of the first processor;
identifying a downscaling rate based on the available use rate of the first processor and the additional use rate of the first processor; and
controlling the first processor, by the second processor, to downscale at least one downscaled stream of the additional stream and each of the plurality of streams to the downscaling rate, based on determining that the additional use rate of the first processor exceeds the available use rate of the first processor.

12. The control method of claim 11, wherein the controlling of the first processor comprises:
identifying the number of the at least one downscaled stream, based on the available use rate of the first processor and the additional use rate of the first processor.

13. The control method of claim 11, wherein the controlling of the first processor further comprises:
based on determining that a resolution of the at least one downscaled stream is smaller than a predetermined lowest resolution threshold, downscaling the at least one downscaled stream to the predetermined lowest resolution threshold, and increasing a number of the at least one downscaled stream.

14. The control method of claim 11, wherein the controlling of the first processor comprises:
controlling the first processor, by the second processor, to downscale the at least one downscaled stream, based on the determining that the additional use rate of the first processor exceeds the available use rate of the first processor, and according to respective resolutions of each stream of the at least one downscaled stream.

15. The control method of claim 11, wherein the controlling comprises:
controlling the first processor, by the second processor, to downscale at least one of the plurality of streams, based on the determining that the additional use rate of the first processor exceeds the available use rate of the first processor.

16. The control method of claim 11, further comprising: upscaling the at least one downscaled stream.

17. A non-transitory computer-readable storage medium storing computer-executable instructions for processing a plurality of streams that, when executed by at least one processor of an electronic apparatus, cause the electronic apparatus to:
   decode the plurality of streams;
   store the plurality of streams in a corresponding plurality of buffer groups;
   acquire, by a first processor of the electronic apparatus, one frame by relocating decoded data output from each of the plurality of buffer groups;
   identify, by a second processor of the electronic apparatus, an additional use rate of the first processor sufficient for processing an additional stream, based on a first determination that the additional stream in addition to the plurality of streams is to be processed;
   determine whether the additional use rate of the first processor exceeds an available use rate of the first processor;
   identify a downscaling rate based on the available use rate of the first processor and the additional use rate of the first processor; and
   control the first processor, by the second processor, to downscale at least one downscaled stream of the additional stream and each of the plurality of streams to the downscaling rate, based on a second determination that the additional use rate of the first processor exceeds the available use rate of the first processor.

18. The non-transitory computer-readable storage medium of claim 17, wherein the computer-executable instructions, when executed by the at least one processor, further cause the electronic apparatus to:
   identify at least one of the number of the at least one downscaled stream and the downscaling rate of the at least one downscaled stream, based on the available use rate of the first processor and the additional use rate of the first processor.

* * * * *